(12) United States Patent
Scott

(10) Patent No.: US 6,275,044 B1
(45) Date of Patent: Aug. 14, 2001

(54) ARCING FAULT DETECTION SYSTEM

(75) Inventor: Gary W. Scott, Mount Vernon, IA (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/116,089

(22) Filed: Jul. 15, 1998

(51) Int. Cl.[7] .............. G01R 31/08; H02H 3/00; H02H 3/16
(52) U.S. Cl. .............. 324/536; 324/520; 361/42; 361/45
(58) Field of Search .............. 324/536, 520, 324/528, 523; 361/42, 45, 115, 96

(56) References Cited

U.S. PATENT DOCUMENTS

| | | | |
|---|---|---|---|
| 3,660,721 | 5/1972 | Baird | 361/55 |
| 3,716,757 | 2/1973 | Rodriguez | 317/40 |
| 4,166,260 | 8/1979 | Gillette | 335/20 |
| 4,251,846 | 2/1981 | Pearson et al. | 361/30 |
| 4,264,856 | 4/1981 | Frierdich et al. | 322/25 |
| 4,316,187 | 2/1982 | Spencer | 340/664 |
| 4,344,100 | 8/1982 | Davidson et al. | 361/45 |
| 4,354,154 | 10/1982 | Schiemann | 324/126 |
| 4,356,443 | 10/1982 | Emery | 324/51 |
| 4,387,336 | 6/1983 | Joy et al. | 324/51 |
| 4,459,576 | 7/1984 | Fox et al. | 336/84 |
| 4,466,071 | 8/1984 | Russell, Jr. | 364/492 |
| 4,477,855 | 10/1984 | Nakayama et al. | 361/54 |
| 4,587,588 | 5/1986 | Goldstein | 361/54 |
| 4,616,200 | 10/1986 | Fixemer et al. | 335/35 |

(List continued on next page.)

FOREIGN PATENT DOCUMENTS

| | | | |
|---|---|---|---|
| 2256208 | 6/1999 | (CA) | |
| 2256243 | 6/1999 | (CA) | |
| 2265204 | 12/1999 | (CA) | |
| 0 094 871 A1 | 5/1983 | (EP) | |
| 0 615 327 | 9/1994 | (EP) | H02H/1/00 |
| 0 649 207 A1 | 4/1995 | (EP) | |

(List continued on next page.)

OTHER PUBLICATIONS

Antonio N. Paolantonio, P.E., Directional Couplers, R.F. Design, Sep./Oct., 1979, pp. 40–49.

Alejandro Duenas, J., Directional Coupler Design Graphs For Parallel Coupled Lines and Interdigitated 3 dB Couplers, RF Design, Feb., 1986, pp. 62–64.

RV4145 Low Power Ground Fault Interrupter, Preliminary Product Specifications of Integrated Circuits, Raytheon Company Semiconductor Division, 350 Ellis Street, Mountain View CA 94309–7016, pp. 1–8.

(List continued on next page.)

Primary Examiner—Safet Metjahic
Assistant Examiner—Jermele M. Hollington
(74) Attorney, Agent, or Firm—Kareem M. Irfan; Larry I. Golden

(57) ABSTRACT

An electrical isolation device is provided for use in an electrical distribution network having a plurality of branch circuits each defined by line and neutral conductors connected between a power source and a load, the line conductor being electrically connected to one of a plurality of line buses at an electrical distribution panelboard, the neutral conductor being electrically connected to a neutral bus at the electrical distribution panelboard. The isolation device includes a capacitance coupled between the line and neutral conductor of each of the branch circuits and is designed to provide a low impedance path for an arcing fault occurring on the line conductor of the branch circuit. The capacitance is sufficiently large to provide power factor correcting current.

16 Claims, 5 Drawing Sheets

U.S. PATENT DOCUMENTS

| | | | |
|---|---|---|---|
| 4,639,817 | 1/1987 | Cooper et al. | 361/62 |
| 4,642,733 | 2/1987 | Schacht . | |
| 4,644,439 | 2/1987 | Taarning | 361/87 |
| 4,652,867 | 3/1987 | Masot | 340/638 |
| 4,658,322 | 4/1987 | Rivera | 361/37 |
| 4,697,218 | 9/1987 | Nicolas | 633/882 |
| 4,702,002 | 10/1987 | Morris et al. | 29/837 |
| 4,707,759 | 11/1987 | Bodkin | 831/642 |
| 4,771,355 | 9/1988 | Emery et al. | 361/33 |
| 4,810,954 | 3/1989 | Fam | 324/142 |
| 4,816,958 | 3/1989 | Belbel et al. | 361/93 |
| 4,835,648 | 5/1989 | Yamauchi | 361/14 |
| 4,845,580 | 7/1989 | Kitchens | 361/91 |
| 4,847,719 | 7/1989 | Cook et al. | 361/13 |
| 4,853,818 | 8/1989 | Emery et al. | 361/33 |
| 4,858,054 | 8/1989 | Franklin | 361/57 |
| 4,866,560 | 9/1989 | Allina | 361/119 |
| 4,882,682 | 11/1989 | Takasuka et al. | 364/507 |
| 4,893,102 | 1/1990 | Bauer | 335/132 |
| 4,901,183 | 2/1990 | Lee | 361/56 |
| 4,922,368 | 5/1990 | Johns | 361/62 |
| 4,931,894 | 6/1990 | Legatti | 361/45 |
| 4,939,495 | 7/1990 | Peterson et al. | 337/79 |
| 4,949,214 | 8/1990 | Spencer | 361/95 |
| 4,969,063 | 11/1990 | Scott et al. | 361/93 |
| 5,010,438 | 4/1991 | Brady | 361/56 |
| 5,047,724 | 9/1991 | Boksiner et al. | 324/520 |
| 5,051,731 | 9/1991 | Guim et al. | 340/638 |
| 5,121,282 * | 6/1992 | White | 361/42 |
| 5,166,861 | 11/1992 | Krom | 361/379 |
| 5,168,261 | 12/1992 | Weeks . | |
| 5,179,491 | 1/1993 | Runyan | 361/45 |
| 5,185,684 | 2/1993 | Beihoff et al. | 361/45 |
| 5,185,685 | 2/1993 | Tennie et al. | 361/45 |
| 5,185,686 | 2/1993 | Hansen et al. | 361/45 |
| 5,185,687 | 2/1993 | Beihoff et al. | 361/45 |
| 5,206,596 | 4/1993 | Beihoff et al. | 324/536 |
| 5,208,542 | 5/1993 | Tennies et al. | 324/544 |
| 5,223,795 | 6/1993 | Blades | 324/536 |
| 5,224,006 | 6/1993 | MacKenzie et al. | 361/45 |
| 5,257,157 | 10/1993 | Epstein | 361/111 |
| 5,280,404 | 1/1994 | Ragsdale | 361/113 |
| 5,286,933 | 2/1994 | Pham . | |
| 5,307,230 | 4/1994 | MacKenzie | 361/96 |
| 5,321,574 | 6/1994 | Patrick et al. | 361/127 |
| 5,334,939 | 8/1994 | Yarbrough . | |
| 5,353,014 | 10/1994 | Carroll et al. | 340/638 |
| 5,359,293 | 10/1994 | Boksiner et al. | 324/544 |
| 5,363,269 | 11/1994 | McDonald . | |
| 5,383,084 | 1/1995 | Gershen et al. | 361/113 |
| 5,388,021 | 2/1995 | Stahl | 361/56 |
| 5,412,526 | 5/1995 | Kapp et al. | 361/56 |
| 5,414,590 | 5/1995 | Tajali | 361/669 |
| 5,420,740 | 5/1995 | MacKenzie et al. | 361/45 |
| 5,434,509 | 7/1995 | Blades | 324/536 |
| 5,444,424 | 8/1995 | Wong et al. | 335/172 |
| 5,446,431 | 8/1995 | Leach et al. | 335/18 |
| 5,448,443 | 9/1995 | Muellman | 361/111 |
| 5,452,222 | 9/1995 | Gray et al. | 364/481 |
| 5,459,630 | 10/1995 | MacKenzie et al. | 361/45 |
| 5,473,494 | 12/1995 | Kurosawa et al. | 361/3 |
| 5,483,211 | 1/1996 | Carrodus et al. | 335/18 |
| 5,485,093 | 1/1996 | Russell et al. | 324/522 |
| 5,493,278 | 2/1996 | MacKenzie et al. | 340/638 |
| 5,506,789 | 4/1996 | Russell et al. | 364/492 |
| 5,510,946 | 4/1996 | Franklin . | |
| 5,512,832 | 4/1996 | Russell et al. | 324/522 |
| 5,519,561 | 5/1996 | Mrenna et al. | 361/105 |
| 5,531,617 | 7/1996 | Marks | 439/723 |
| 5,537,327 | 7/1996 | Snow et al. | 364/483 |
| 5,546,266 | 8/1996 | Mackenzie et al. | 361/93 |
| 5,561,605 | 10/1996 | Zuercher et al. | 364/483 |
| 5,568,371 | 10/1996 | Pitel et al. | 363/39 |
| 5,578,931 | 11/1996 | Russell et al. | 324/536 |
| 5,590,010 | 12/1996 | Ceola et al. | 361/93 |
| 5,590,012 | 12/1996 | Dollar | 361/113 |
| 5,602,709 | 2/1997 | Al-Dabbagh | 361/85 |
| 5,608,328 | 3/1997 | Sanderson | 324/529 |
| 5,642,052 | 6/1997 | Earle | 324/556 |
| 5,657,244 | 8/1997 | Seitz | 364/492 |
| 5,659,453 | 8/1997 | Russell et al. | 361/93 |
| 5,661,645 | 8/1997 | Hochstein | 363/89 |
| 5,682,101 * | 10/1997 | Brooks et al. | 324/536 |
| 5,691,869 | 11/1997 | Engel et al. . | |
| 5,710,513 | 1/1998 | March | 324/424 |
| 5,729,145 | 3/1998 | Blades | 324/536 |
| 5,764,125 | 6/1998 | May | 336/92 |
| 5,805,397 | 9/1998 | MacKenzie | 361/42 |
| 5,805,398 | 9/1998 | Rae | 361/42 |
| 5,812,352 | 9/1998 | Rokita et al. | 361/58 |
| 5,815,352 | 9/1998 | MacKenzie | 361/42 |
| 5,818,237 | 10/1998 | Zuercher et al. | 324/536 |
| 5,818,671 | 10/1998 | Seymour et al. | 361/42 |
| 5,825,598 * | 10/1998 | Dickens et al. | 361/42 |
| 5,834,940 * | 11/1998 | Brooks et al. | 324/536 |
| 5,835,319 | 11/1998 | Welles, II et al. | 361/5 |
| 5,835,321 | 11/1998 | Elms et al. | 361/45 |
| 5,839,092 * | 11/1998 | Erger et al. | 361/42 |
| 5,847,913 | 12/1998 | Turner et al. | 361/93 |
| 5,886,861 | 3/1999 | Parry | 361/42 |
| 5,889,643 * | 3/1999 | Elms | 361/42 |
| 5,896,262 | 4/1999 | Rae et al. | 361/94 |
| 5,905,619 | 5/1999 | Jha | 361/93 |
| 5,933,305 | 8/1999 | Schmalz et al. | 361/42 |
| 5,933,308 | 8/1999 | Garzon | 361/62 |
| 5,946,179 | 8/1999 | Fleege et al. | 361/93 |
| 5,963,406 * | 10/1999 | Neiger et al. | 361/42 |
| 5,969,920 | 10/1999 | MacKenzie | 361/42 |
| 5,982,593 | 11/1999 | Kimblin et al. | 361/42 |
| 5,986,860 * | 11/1999 | Scott | 361/42 |
| 6,002,561 | 12/1999 | Dougherty | 361/42 |
| 6,014,297 * | 3/1999 | Clarey et al. | 316/42 |
| 6,031,699 | 2/2000 | Dollar, II et al. | 361/142 |
| 6,040,967 | 3/2000 | DiSalvo | 361/142 |

FOREIGN PATENT DOCUMENTS

| | | | |
|---|---|---|---|
| 0 748 021 A1 | 12/1996 | (EP) . | |
| 0 762 591 A2 | 3/1997 | (EP) . | |
| 0 802 602 A2 | 10/1997 | (EP) . | |
| 0945949A2 | 9/1999 | (EP) . | |
| 0954003A2 | 11/1999 | (EP) . | |
| 0974995A2 | 1/2000 | (EP) . | |
| 0981193A2 | 2/2000 | (EP) . | |
| 2 177 561 | 6/1985 | (GB) . | |
| 2215149A | 9/1989 | (GB) . | |
| 2285886A | 7/1995 | (GB) . | |
| WO 97/30501 | 8/1997 | (WO) . | |
| WO 00/04619 * | 1/2000 | (WO) | H02H/3/00 |

OTHER PUBLICATIONS

Jean–Francois Joubert, Feasibility of Main Service Ground–Fault Protection On The Electrical Service To Dwelling Units, Consultants Electro–Protection Ins., 1980, Michelin St., Laval, Quebec H7L 9Z7. Oct. 26, 1990, pp. 1–77.

R.D. Russell, Detection Of Arcing Faults On Distribution Feeders, Texas A & M Research Foundation, Box H. College Station, Texas 77843, Final Report Dec., 1982, pp. 1–B18.

EP0502393A2, dated Feb. 24, 1992, Abstract.

EP0911937A2, dated Sep. 11, 1998, Abstract.

JP 06308191, dated Apr. 11, 1994, Abstract.

* cited by examiner

ARCING FAULT DETECTION SYSTEM

FIELD OF THE INVENTION

The present invention relates to protective devices used in electrical distribution systems. Specifically, the present invention relates to arcing fault detection systems that include isolation devices for isolating arcing fault signals to one of a plurality of branch circuits in an electrical power distribution system.

SUMMARY OF THE INVENTION

It is a primary object of the present invention to provide an arcing fault detection system that includes an improved isolation circuit that not only provides a low impedance path for arcing fault signals but also provides power factor-correcting current and improves the surge absorption capability of the system. The low impedance path isolates high-frequency arcing fault signals to the branch circuit in which they occur.

One specific object of the invention is to provide such an improved arcing fault detection system that is capable of providing a power factor-correcting current in the range from about 1 to about 5 amps. Improving the power factor improves the transmission efficiency of the power distribution system.

It is another object of the invention to provide such an improved arcing fault detection system that is adaptable for use in an electrical distribution panelboard servicing multiple branch circuits.

A further object of the invention is to provide an improved arcing fault detection system that isolates an arcing fault signal occurring in one branch circuit of a power distribution system from other branch circuits in the same system while improving the detection of the arcing fault signal by increasing the signal generated by arcing faults, particularly series arcs, thereby improving the reliability of detection of the arcing faults.

In accordance with the present invention, the foregoing objectives are realized by providing an arcing fault detection system for an electrical distribution system distributing power from a utility source through a plurality of branch circuits each having line and neutral conductors for delivering power to a load. The arcing fault detection system comprises an arcing fault detector coupled to each branch circuit for detecting the occurrence of a high-frequency arcing fault signal in that branch circuit; an isolation circuit on the power side of each arcing fault detector, the isolation circuit comprising a line-to-neutral capacitance to provide a low impedance path for the arcing fault signal, the capacitance being sufficiently large to provide power factor correcting current; and at least one line interrupter for disconnecting the load from the power source in any of the branch circuits in which an arcing fault signal has been detected.

DETAILED DESCRIPTION

While the invention will be described in connection with certain preferred embodiments, it will be understood that it is not intended to limit the invention to those particular embodiments. On the contrary, it is intended to cover all alternatives, modifications and equivalents as may be included within the spirit and scope of the invention as defined by the appended claims.

Figure 1:
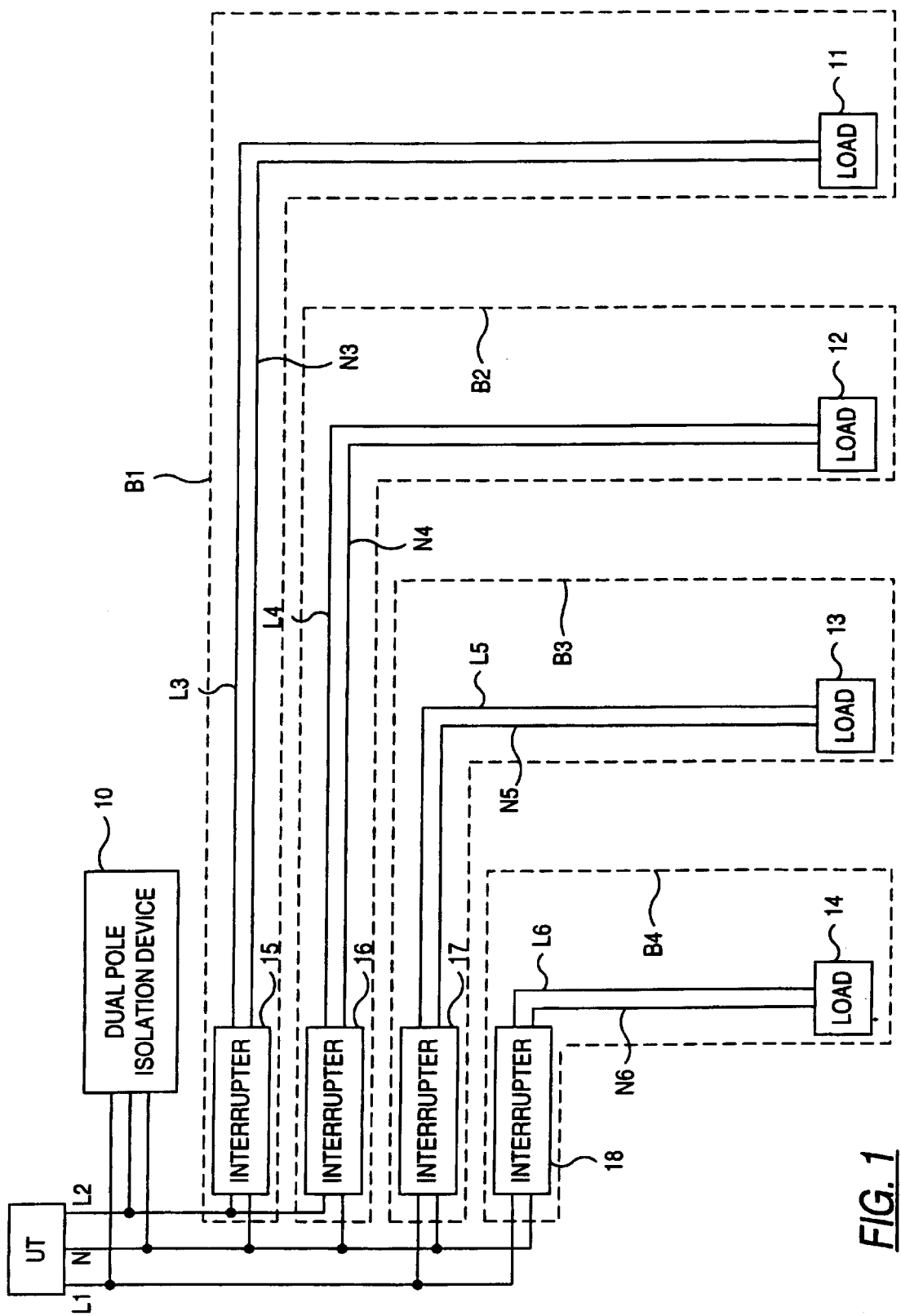
FIG. 1 is a block diagram of an electrical distribution network using an arcing fault detection system embodying the present invention.

Turning now to the drawings and referring first to FIG. 1, a dual-pole isolator or isolation device 10 is connected to a first line bus L1, a second line bus L2, and a neutral bus N of an electrical distribution network. The electrical distribution network delivers electrical power from a utility transformer UT to multiple branch circuits B1, B2, B3 and B4 each including respective line conductors L3, L4, L5 and L6 and a neutral conductor N3, N4, N5, N6 for delivering electrical power to respective loads 11, 12, 13 and 14. Line interrupters 15, 16, 17 and 18 are attached to the respective line conductors L3, L4, L5 and L6 of each branch circuit between the power source and the load. The line bus L2 is connected to the line interrupters 15 and 16, while the line bus L1 is connected to the interrupters 17 and 18. The line interrupters 15–18 may include arc fault detectors and are designed to break the current flow in a particular branch circuit B1, B2, B3, or B4 when an arcing fault is detected in the branch circuit. It will be appreciated that the illustrative electrical distribution network is exemplary only.

The dual-pole isolation device 10 is designed to ensure that high frequency arcing fault signals present on any of the branch circuits B1, B2, B3 or B4 are isolated to the branch circuit on which the arcing fault occurred, thus ensuring that only the line interrupter associated with the branch circuit in which the arcing fault occurred is tripped. More specifically, the isolation device 10 ensures that an arcing fault signal present in the branch circuit BI will not trip the line interrupters 16, 17 or 18, but rather will trip only the line interrupter 15. Similarly, the isolation device 10 ensures that an arcing fault signal present in any of the branch circuits B2, B3 and B4 will trip only respective line interrupter 16, 17 or 18. This is achieved by providing a low impedance path from the line bus L1 to the neutral bus N and from the line bus L2 to the neutral bus N, so that arcing fault signals in any of the branch circuits B1, B2, B3 and B4 are effectively shorted at the line bus L1 or L2, thus preventing the occurrence of an arcing fault signal in one of the branch circuits from producing "false" arcing fault signals in the other branch circuits. By completing the arcing fault signal path, the isolation device 10 also serves to increase the signal strength at the arc fault detector in the branch circuit in which the arcing fault occurred. Preferably, the isolation device 10 also includes surge protection circuitry which protects the electrical distribution network from voltage surges.

Figure 2:
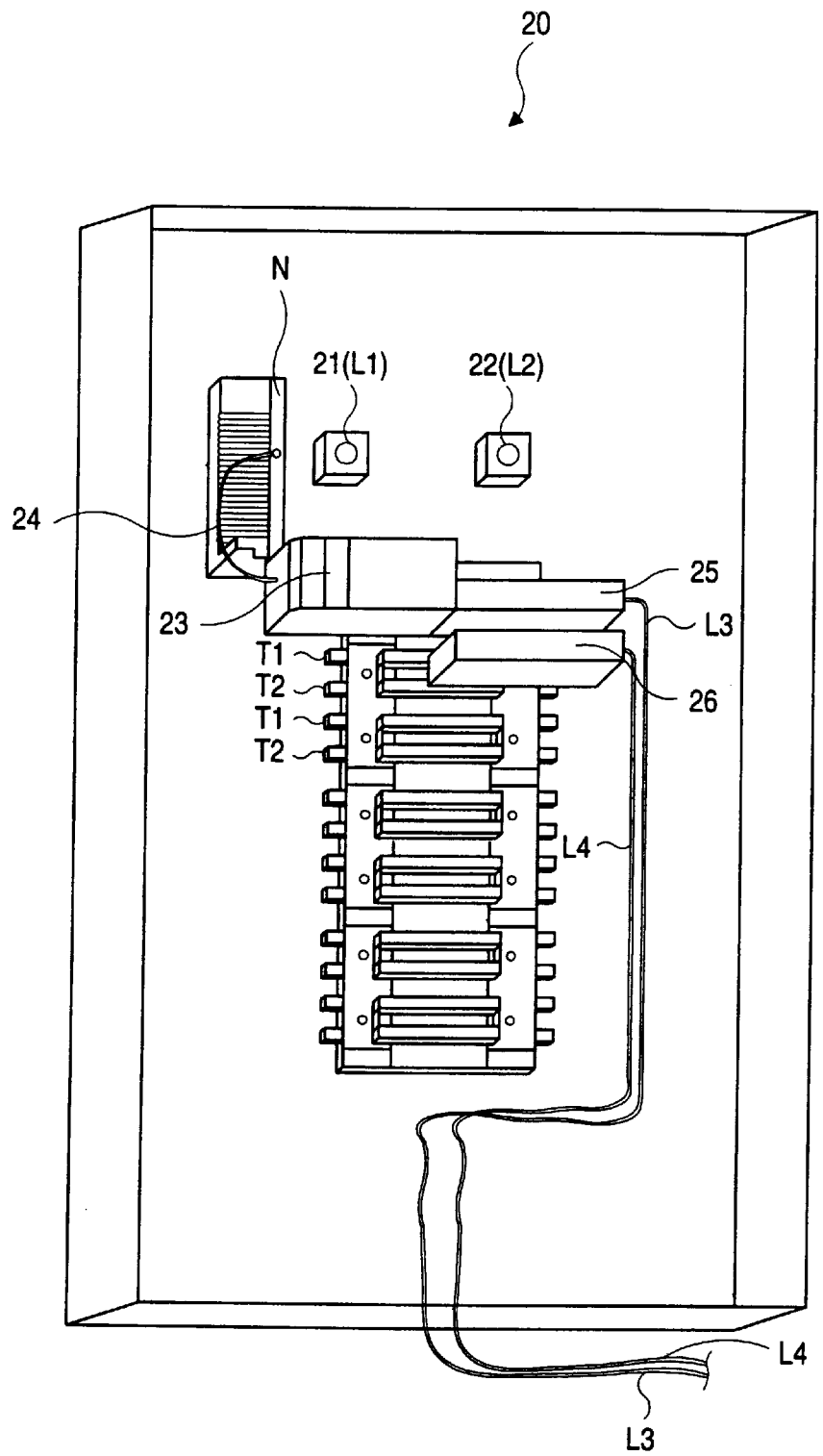
FIG. 2 is a perspective view of a panelboard which uses the arcing fault detection system illustrated in FIG. 1.

Turning now to FIG. 2, there is depicted a panelboard or load center 20 which may be used to house the isolation device according to the present invention. As used herein, the term "panelboard" is intended to encompass electrical distribution devices having current capabilities suitable for residential, commercial, or industrial uses. The panelboard 20 transmits electrical power from a utility source such as the transformer UT to a plurality of branch circuits through line buses L1 and L2 and a neutral bus N. Each branch circuit comprises a line and neutral conductors for delivering electrical power from the panelboard to a load. As shown in FIG. 2, the branch circuits comprise line conductors L3 and L4 and respective neutral conductors (not shown) for delivering electrical power to respective loads (not shown). Each of the line conductors L3 and L4 is electrically connected to one of the line buses L1 or L2, and the neutral conductors are electrically connected to the neutral bus N at the distribution panel. The line conductors L3 and L4 are routed through respective line interrupters 21 and 22.

The line buses L1 and L2 and the neutral bus N are typically at 220 volts or 120 volts and a frequency of 60 Hz and enter the panelboard at a pair of main lugs 21 and 22. A series of bus bar tabs T1 and T2 extend in alternating fashion along the length of the panelboard 20. Each of the tabs T1 is electrically connected to the line bus L1, and each of the tabs T2 is electrically connected to the line bus L2. (The electrical connection between the tabs T1, T2 and the line buses L1, L2 is not shown in FIG. 2.) The dual pole isolation device 10 comprises a module 23 which is connected to one of the tab pairs T1, T2 (not shown in FIG. 2), and thus is electrically connected to both line buses L1 and L2. The dual pole isolation module 23 is electrically connected to the neutral bus N through a standard pig-tail wire 24. As discussed above, the isolation module 23 is designed to ensure that arcing fault signals are "isolated" to the branch circuit in which they occur. For example, the isolation module 23 shown in FIG. 2 ensures that arcing fault signals present on the line conductor L3 do not cross over to the line conductor L4, and vice versa.

Figure 3:
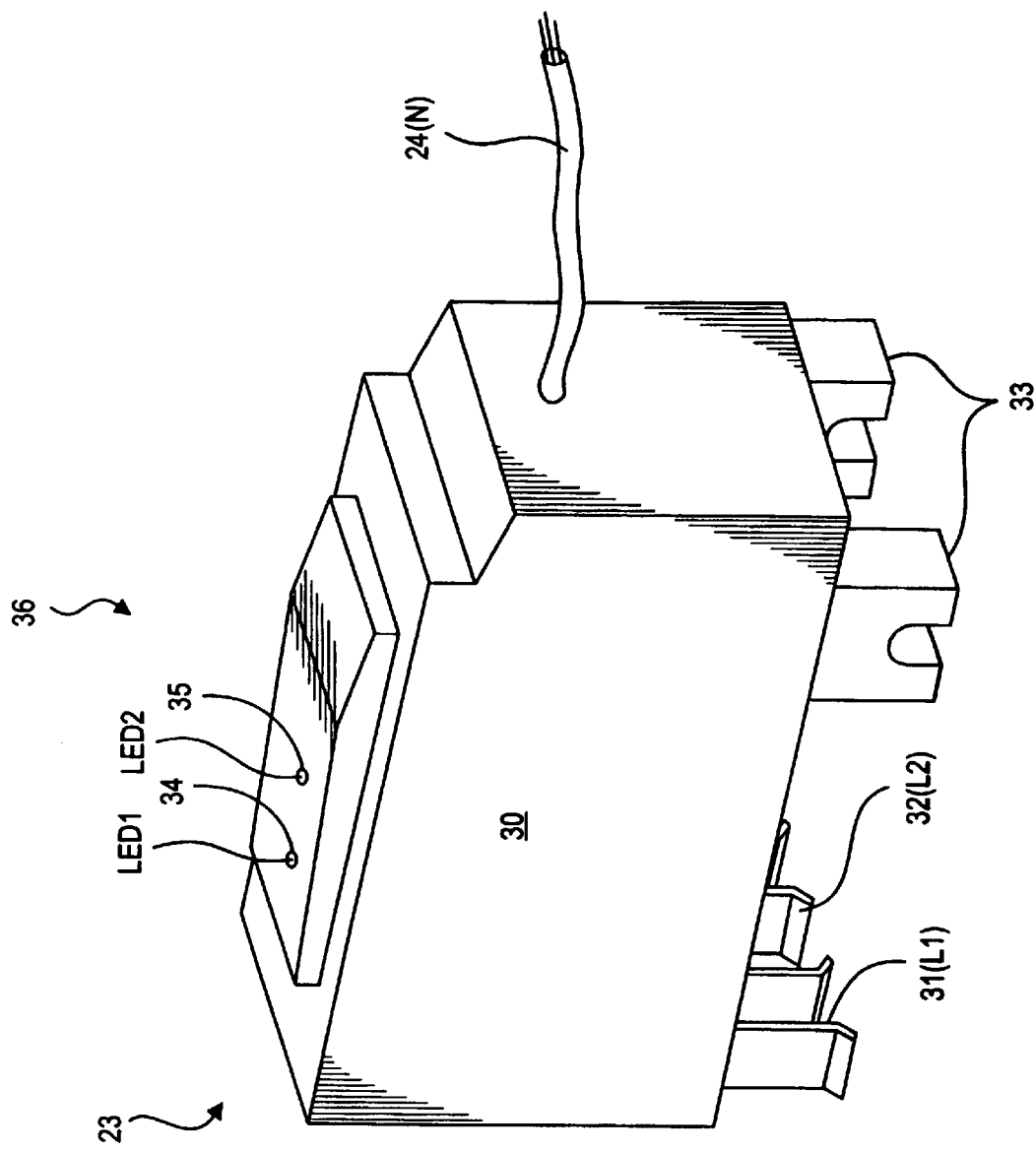
FIG. 3 is an enlarged perspective view of the isolation module attached to the panelboard in FIG. 2.

The dual-pole isolator or isolation module 23 is illustrated in more detail in FIG. 3. A housing 30 is designed to approximate the housing or envelope of a two-pole circuit breaker of the type normally installed in a circuit breaker panel. Two pairs of jaws 31 and 32 at one end of the isolation module 23 are adapted to "snap-on" or plug onto the bus bar tabs T1, T2 of the panelboard and thus provide an electrical connection to respective line buses L1 and L2. For instance, the jaw 31 may be electrically connected to the line bus L1 through connection to the bus bar tab T1, and the jaw 32 may be electrically connected to the line bus L2 through connection to the bus bar tab T2. Rail clips 33 at the other end of the isolation module 23 are adapted to plug onto a mounting rail in the panelboard to help retain the isolation module 23 firmly in position in the panelboard. The pig-tail wire 24 connects the device to the neutral bus N. As will be described below, windows 34, 35 in a top wall 36 of the housing allows a user to see a display, such as light-emitting diodes LED 1 and LED 2 inside the device, as more fully described later.

Referring again to FIG. 2, each branch circuit of the panelboard includes a line interrupter 25 or 26 designed to disconnect the load from the power source in any of the branch circuits in which an arcing fault occurs. In a preferred embodiment, each of the line interrupters 25 and 26 comprises a circuit breaker having a trip mechanism which trips the normally closed breaker contacts to an open circuit condition in response to detection of an arcing fault. One system for detecting arcing faults is described in pending U.S. patent application Ser. No. 08/600,512 filed Feb. 13, 1996, for "Arcing Fault Detection System," now U.S. Pat. No. 5,682,101 assigned to the assignee of the present invention and incorporated herein by reference. The circuit breaker may also respond to overload conditions having thermal/magnetic characteristics, as is known in the art. It is also known to provide the circuit breaker with ground fault interrupter circuitry responding to a line or neutral-to-ground fault to energize a trip solenoid which trips the circuit breaker and opens the contacts.

The line interrupters 25 and 26 may take the form of circuit breakers, fuses, relay automatic switches or other suitable means known in the art. The line interrupters need not be the same type in each of the branch circuits. The line interrupters may be plugged onto or bolted to one of the distribution buses L1 or L2, or they may be mounted separately within the panelboard and connected to one of the distribution buses L1 or L2 by wire.

As mentioned above, the panelboard 20 includes a dual-pole isolation module 23 for electrically isolating arcing-fault signals to the particular branch circuit in which they occur, and for increasing the signal strength of the arcing-fault signal. The isolation module 23 is preferably mounted near the electrical supply source connection within the panelboard. It may be plugged in or bolted onto the neutral bus and the distribution buses L1 and L2, or it may be connected to the bus lines by wire. Preferably, the dual-pole isolation module 23 will include surge protection circuitry to protect either of the distribution buses L1 or L2 from voltage surges. Alternatively, two single-pole isolation devices may be provided, each being connected to the neutral bus N and one of the distribution buses L1 or L2.

In another alternative, the electrical distribution system may include branch isolation modules in one or more of the individual branch circuits to accomplish the same function as the dual-pole isolation module 23 shown in FIG. 2. However, if branch isolation modules are used, the line interrupters 25 and 26 shown in FIG. 2 will not comprise arcing fault detectors because the isolation device will be positioned on the power source side of an arcing fault detector in any given branch circuit. Accordingly, if branch isolation modules are used, arcing fault detection will be provided either by separate arcing fault detector modules positioned on a load side of the branch isolation modules, or by combined arcing fault detector and isolation modules in which the arcing fault detector portion is positioned on the load side of the isolation portion.

Figure 4:
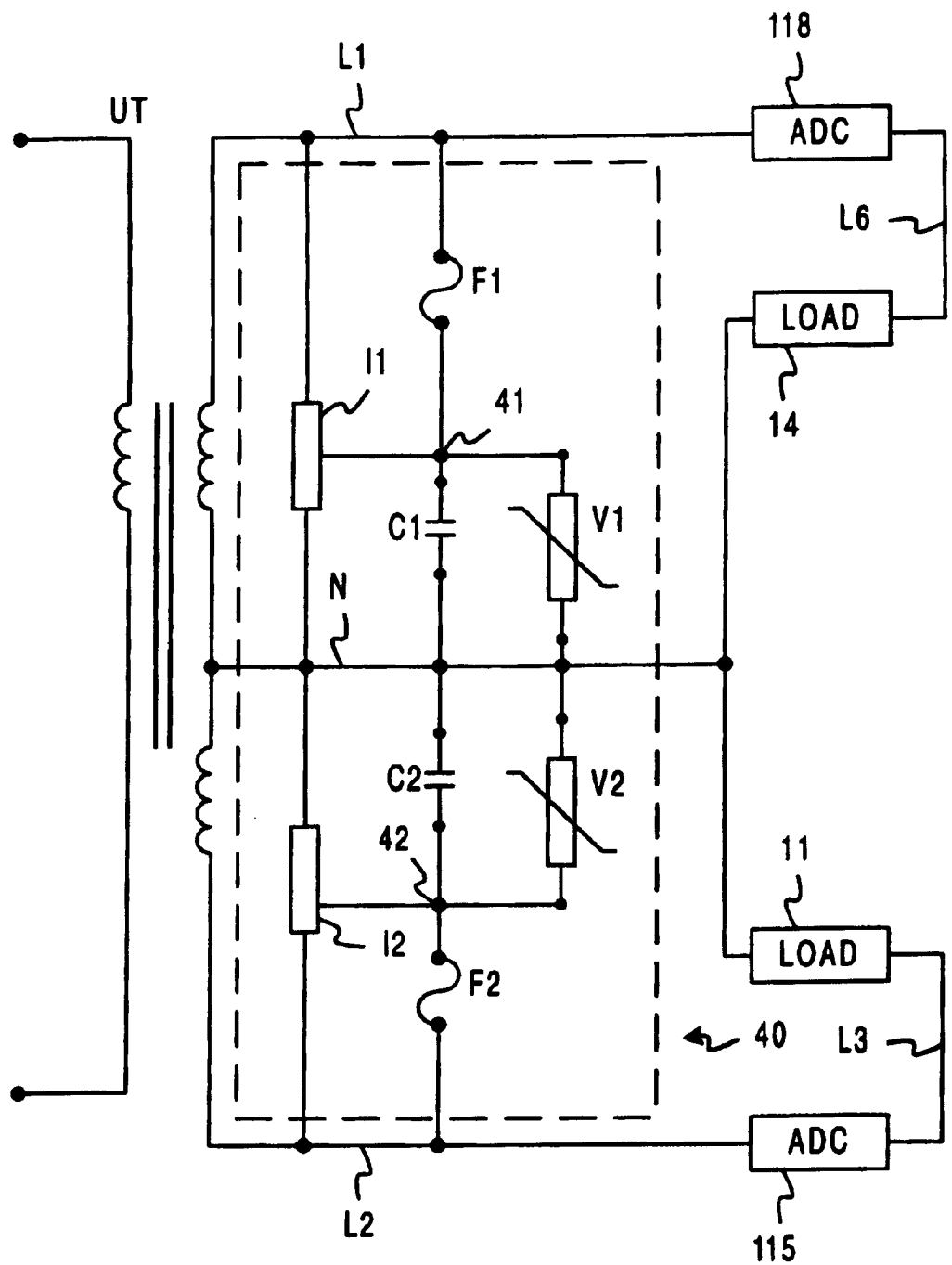
FIG. 4 is a circuit diagram of an isolation circuit for use in the system of FIG. 1 and the module of FIG. 3 in accordance with the present invention.

FIG. 4 illustrates a dual-pole isolation circuit 40 portion of the module 23. The circuit 40 is connected to a utility transformer UT via line buses L1 and L2 and neutral bus N. Referring initially to the portion of the isolation circuitry located between the line bus L1 and the neutral bus N, a fuse F1 is connected between the line bus L1 and a node 41. A capacitor C1 is connected between the node 41 and the neutral line N for reasons which will be more fully described below. A protective device, which may be a varistor V1, such as a metal oxide varistor (MOV) using zinc oxide, is connected in parallel with the capacitor C1 between the node 41 and the neutral bus N. An indicator circuit I1 is coupled to line L1, neutral line N, and node 41 as shown in FIG. 4. A similar fuse F2, capacitor C2, varistor V2 and indicator circuit I2 are connected in similar fashion with respect to the line L2, the neutral line N and a node 42. The fuse F1 (F2) opens if the varistor V1 (V2) fails, that is, if a destructive surge occurs.

Figure 5:
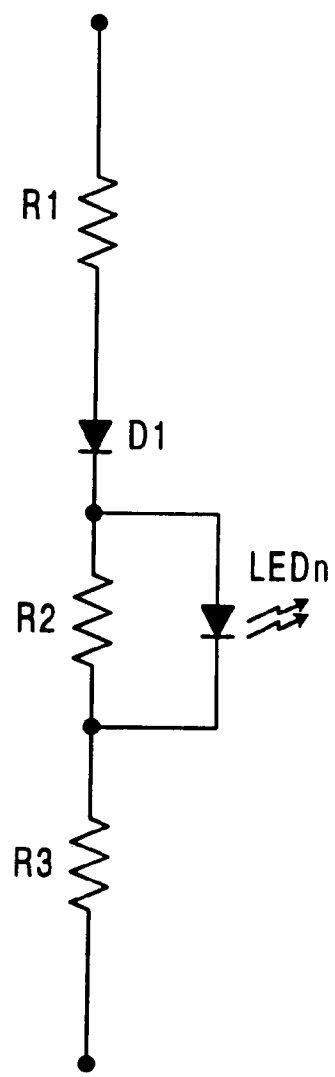
FIG. 5 is a circuit diagram of a display circuit for use with the circuit of FIG. 4.

A circuit which may be used for each indicator circuit I1, I2 is shown in FIG. 5. A resistor R1 and a diode D1 are connected between each node 41, 42 and the corresponding line L1, L2. The resistor R1 develops a voltage across a display resistor R2 connected in parallel with a light-emitting diode LEDn. The diode D1 provides a forward bias between the neutral bus N and the LEDn.

The light-emitting diodes LEDn are the LED's (LED1 and LED2) which are visible through the openings 34 and 35 in the top wall 36 of isolation module 23 shown in FIG. 3. Each LED, such as LED1, provides for monitoring the status condition of the corresponding varistor and fuse pairs, such as V1 and F1.

Referring again to FIG. 4, the capacitor C1 is connected between the node 41 and the neutral bus N to effectively short high-frequency arcing fault signals from line bus L1 to neutral bus N, thus preventing arcing fault signals on line bus L1 from crossing over to line bus L2. In completing the arcing fault signal path from line bus L1 to neutral bus N, the capacitor C1 accomplishes two functions. First, it prevents an arcing fault detector ADC 118 on line bus L1 from detecting a "false" arcing fault signal on line bus L2. Second, it increases the signal strength at the arcing fault detector ADC 118 positioned on line bus L1 on a load side of capacitor C1. Varistor V1 and V2 connected between the nodes 41, 42 and the neutral bus N provide a degree of surge protection for the isolation circuitry connected between each line bus L1, L2 and the neutral bus N.

Referring now to the remainder of the isolation circuitry 40 of FIG. 4 located between line bus L2 and neutral bus N, the capacitor C2 is connected between node 42 and the neutral bus N. Capacitor C2 is designed to complete the arcing fault signal path from line bus L2 to neutral bus N by effectively shorting high frequency arcing fault signals from the line bus L2 to neutral bus N. Thus, similar to the capacitor C1 described above, the capacitor C2 prevents an arcing fault detector ADC 115 on line bus L2 from detecting a "false" arcing fault signal on line bus L1, and increases the signal strength at an arcing fault detector ADC 115 positioned on line bus L2 on a load side of capacitor C2. The varistor V2 provides a degree of surge protection for the isolator circuitry connected between line bus L2 and neutral bus N.

As is well known, the power factor is the cosine of the angle of lag or lead between the voltage and current being supplied to a load. A large power factor is generally desirable, which means that the angle of lag or lead should be small. With the line-to-neutral capacitance C1, C2, the leading current drawn by the capacitance compensates for compensates for the lagging current drawn by the load. The capacitance takes essentially no net power from the line. The result is that magnetizing current is supplied from the load center rather than from the utility furnishing the power.

A typical 25 kVA distribution transformer (UT) requires about 2 percent (500 VA) of its rating as magnetizing current. This can be provided, for example by about 0.03 uF from the utility side primary at 7200 V, or by 23 uF connected at the load center from line-to-line at 240 V or by the two capacitors C1, C2 each of about 46 uF connected line-to-line neutral at 120 V, as shown in FIG. 4. The configuration shown in FIG. 4 (line-to-line neutral capacitors) increases the arc signal from a series arc to a branch breaker containing an arc detection circuit, as discussed above. Since several residences may share a utility transformer, the capacitance of each load center may vary or be determined by the utility.

In addition, the line-to-neutral capacitance C1, C2 decreases the natural frequency between the isolator and the utility-owned distribution transformer to low harmonics of 60 Hz. This avoids high-frequency oscillations and noise in the system which can be mistaken for arcing fault signals.

The line-to-neutral capacitance C1, C2 also has the beneficial effect of shunting high-frequency voltage disturbances, which provides improved surge protection against voltage impulses induced in the power distribution system.

The provision of the capacitors C1 and C2 provide several advantages, as outlined briefly above, namely, they improve the detection of arcing signals by an arc detector 18, they provide power factor correcting current and they improve the surge absorption capability of the load center. The capacitors C1 and C2 are selected to have sufficiently large capacitance to provide these benefits. Also, the series resistance is thereby kept to a minimum to reduce heat generation. In the illustrated example, each capacitor C1, C2 is rated for 130 volts AC or more continuous and has a value of between 20 uF and 100 uF. The capacitors may be enclosed or packaged as a two-pole plug-in devices or as a hard-wired module. The capacitors C1 and C2 (and other components) should be selected such that the completed module 23 meets ANSI C62.11 for surge protection, as well as provide a power factor current contribution of between 1 and 5 amps and arc fault signal enhancement as noted above. The capacitors C1 and C2 may be Panasonic JSU18X206AQD which are rated 180 VAC and 20 uF.

The power factor correction provided by capacitors C1 and C2 also increases the signal generated by arcs, particularly series arcs, making the arc detection by the arc detector circuitry 115, 118 more reliable.

It will be appreciated that the design and operation of the two-pole isolation device heretofore described may be similarly applied to single-pole isolation devices or multi-pole isolation devices. The circuit for a single-pole isolation device will be substantially similar to the above-described two-pole isolation device, the difference being that it will contain only the circuitry FIG. 4 located between the line bus L1 and neutral bus N.

Thus, an electrical isolation device is provided where faults are isolated to the electrical branch of the electrical distribution network where they occur. The isolation device can be a single-pole, dual-pole or multiple-pole device and is adaptable for use on the power source side of an arcing fault detector. The device can be constructed such that it is adaptable for use in a variety of areas of an electrical panelboard. The isolation device also contains circuitry which suppresses voltage surges occurring in the electrical distribution network.

While the present invention has been described with reference to one or more preferred embodiments, those skilled in the art will recognize that many changes may be made thereto without departing from the spirit and scope of the present invention, which is set forth in the following claims.

What is claimed is:

1. An arcing fault detection system for an electrical distribution system distributing power from a utility source through a plurality of branch circuits each having line and neutral conductors for delivering said power to a load, said arcing fault detection system comprising:

an arcing fault detector in each branch circuit for detecting the occurrence of a high-frequency arcing fault signal in that branch circuit;

an isolation circuit on the power side of each arcing fault detector, said isolation circuit comprising a capacitance to provide a low impedance path to neutral for said arcing fault signal, said capacitance being sufficiently large to provide a power factor correcting current contribution of about 1 to about 5 amps; and at least one line interrupter in each branch circuit and responsive to said arcing fault detector for disconnecting the load from the power source in any of the branch circuits in which an arcing fault signal has been detected.

2. The arcing fault detection system of claim 1 which includes a load center containing said capacitance to improve the surge absorption capability of the load center.

3. The arcing fault detection system of claim 1 wherein said capacitance decreases the amount of high frequency oscillations and noise which reach the arcing fault detector.

4. A load center for distributing power from a utility source through a plurality of branch circuits each having line and neutral conductors for delivering said power to a load, said load center comprising:

an arcing fault detector in each branch circuit for detecting the occurrence of a high-frequency arcing fault signal in that branch circuit;

an isolation circuit on the power side of each arcing fault detector, said isolation circuit comprising a capacitance to provide a low impedance path to neutral for said arcing fault signal, said capacitance being sufficiently large to provide power factor correcting current contribution from about 1 to about 5 amps; and at least one line interrupter in each branch circuit for disconnecting the load from the power source in any of the branch circuits in which an arcing fault signal has been detected.

5. The load center of claim 4 wherein said capacitance is sufficiently large to improve the surge absorption capability of the load center.

6. The load center of claim 4 wherein said capacitance decreases the amount of high frequency oscillations and noise which reach the arcing fault detector.

7. An isolator for an electrical distribution system distributing power from a utility source through a plurality of branch circuits each having line and neutral conductors for delivering said power to a load, said electrical distribution system having an arcing fault detector in each branch circuit for detecting the occurrence of a high-frequency arcing fault signal in that branch circuit, said isolator comprising:

an isolation circuit including a capacitance to provide a low impedance path to neutral for said arcing fault signal, said capacitance being sufficiently large to provide power factor correcting current contribution from about 1 to about 5 amps.

8. The isolator of claim 7 wherein said capacitance is sufficiently large to improve the surge absorption capability of the isolator.

9. The isolator of claim 7 wherein said capacitance decreases the amount of high frequency oscillations and noise which reach the arcing fault detector.

10. The electrical isolation device of claim 7 including a display coupled to said capacitance for indicating the condition of said isolation device.

11. The electrical isolation device of claim 10 where said display comprises a light emitting diode (LED).

12. The isolation of claim 7, wherein said isolation circuit further includes a protective device coupled in parallel with said capacitance.

13. The isolator of claim 12 wherein said protective device comprises a metal oxide varistor.

14. The isolator of claim 7 wherein said isolation circuit further includes a fuse coupled in series between a line side of the circuit and said capacitances.

15. The isolator of claim 11 further including a housing for enclosing said isolation circuit, said housing having a window for viewing said LED.

16. The isolator of claim 15 wherein said housing further includes snap-on connector means configured for providing an electrical connection to a line bus of a panelboard.

* * * * *